United States Patent
Zhu et al.

(10) Patent No.: US 9,906,280 B2
(45) Date of Patent: Feb. 27, 2018

(54) PRINCIPAL EIGEN BEAM QUANTIZATION FOR MIMO SYSTEMS

(71) Applicant: Intel IP Corporation, Santa Clara, CA (US)

(72) Inventors: Yuan Zhu, Beijing (CN); Qinghua Li, San Ramon, CA (US); Yang Tang, Pleasanton, CA (US); Xiaogang Chen, Beijing (CN); Jong-Kae J. K. Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/798,820

(22) Filed: Jul. 14, 2015

(65) Prior Publication Data

US 2016/0013838 A1    Jan. 14, 2016

Related U.S. Application Data

(60) Provisional application No. 62/024,343, filed on Jul. 14, 2014.

(51) Int. Cl.
*H04B 7/04* (2017.01)
*H04B 7/0417* (2017.01)
(Continued)

(52) U.S. Cl.
CPC .......... *H04B 7/043* (2013.01); *H04B 7/0417* (2013.01); *H04B 7/0456* (2013.01);
(Continued)

(58) Field of Classification Search
CPC ........................ H04L 27/10; H04L 27/1563
(Continued)

(56) References Cited

U.S. PATENT DOCUMENTS

| 2006/0094373 A1* | 5/2006 | Hottinen | H04B 7/0617 455/73 |
| 2006/0203708 A1* | 9/2006 | Sampath | H04B 7/0417 370/208 |

(Continued)

OTHER PUBLICATIONS

International Search Report and Written Opinion received in corresponding PCT Application PCT/US15/44737 dated Oct. 29, 2015.

(Continued)

*Primary Examiner* — Janice Tieu
(74) *Attorney, Agent, or Firm* — Ledell Ansari, LLP (57) ABSTRACT

A closed loop MIMO feedback system is described in which the number of available antenna ports is less than the number of antenna elements. In one implementation, sounding reference signals, received from a number of UEs, may be used, by a base station, to generate and transmit a number of OFDMA Channel State Information Reference Signals (CSI-RSs). The OFDMA CSI-RSs may be determined based on the top eigen beams associated with an average channel covariance matrix determined based on the received sounding reference signals. A UE, in response to receiving the OFDMA CSI-RSs, may determine a preferred eigen beam and transmit a quantized version of the preferred eigen beam back to the eNB. Subsequent communications with the UE may be made using beamforming techniques that are based on the quantized version of the preferred eigen beam.

18 Claims, 9 Drawing Sheets

(51) Int. Cl.
  *H04L 5/00* (2006.01)
  *H04W 74/00* (2009.01)
  *H04B 7/0456* (2017.01)
  *H04B 7/06* (2006.01)
(52) U.S. Cl.
  CPC ......... *H04B 7/0617* (2013.01); *H04B 7/0639* (2013.01); *H04L 5/0007* (2013.01); *H04L 5/0048* (2013.01); *H04W 74/004* (2013.01)
(58) Field of Classification Search
  USPC .......................................................... 375/267
  See application file for complete search history.

(56) References Cited

U.S. PATENT DOCUMENTS

| | | | | |
|---|---|---|---|---|
| 2009/0046570 | A1* | 2/2009 | Sarkar | H04B 7/0417 370/203 |
| 2009/0247200 | A1* | 10/2009 | Hwang | H04B 7/022 455/507 |
| 2012/0329502 | A1* | 12/2012 | Frederiksen | H04L 1/0026 455/509 |
| 2014/0146863 | A1* | 5/2014 | Seol | H04B 7/0456 375/224 |
| 2014/0177745 | A1 | 6/2014 | Krishnamurthy et al. | |
| 2014/0341048 | A1* | 11/2014 | Sajadieh | H04L 5/0085 370/252 |

OTHER PUBLICATIONS

Salzer et al., "On Spatial Covariance Matrices for Downlink Eigen-Beamforming in Multi-Carrier CDMA," 2005 IEEE International Conference on Acoustics, Speech, and Signal Processing—Mar. 18-23, 2005, p. 1133-1136; Mar. 18, 2005.

3rd Generation Partnership Project; Technical Specification Group Radio Access Network; Study on 3D channel model for LTE (Release 12); 3GPP TR 36.873 v1.3.0; Feb. 2014.

* cited by examiner

PRINCIPAL EIGEN BEAM QUANTIZATION FOR MIMO SYSTEMS

RELATED APPLICATIONS

The present application claims the benefit of U.S. Provisional Patent Application No. 62/024,343, which was filed on Jul. 14, 2014, and which is hereby incorporated by reference as though fully set forth herein.

BACKGROUND

Modern radio communication systems are under pressure to provide faster data rates. One technique for using the transmission channel to increase data rates is based on the use of multiple antenna systems. Multiple antenna systems are typically known as Multiple Input, Multiple Output (MIMO) systems.

Radio communications can be improved using different diversity modes. Different diversity modes include time diversity (different timeslots and channel coding), frequency diversity (different channels, spread spectrum, and Orthogonal Frequency Division Multiple Access (OFDMA)), and also spatial diversity. Spatial diversity may be implemented though MIMO techniques in which multiple antennas are used at the transmitter or the receiver end. MIMO technology can also be used to increase the data rate (spatial multiplexing).

Long Term Evolution (LTE) Advanced-based communication systems are defined to include a number of antenna ports. In LTE, an antenna port may refer to a logical port that is used to control one or more physical antenna elements.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

In LTE-Advanced systems, reference signals, such as the the Channel State Information Reference Signal (CRS-RS), can be used by User Equipment (UE) to feedback the channel state information, relating to the downlink (e.g., from a base station to the UE) direction, back to the base station. The downlink channel state information can be used to implement a closed loop MIMO feedback system in order to improve signal reception.

Techniques described herein relate to a closed loop MIMO feedback system in which the number of available antenna ports is less than the number of antenna elements. In one implementation, sounding reference signals, received from a number of UEs, may be used, by a base station (which may be referred to as an Evolved Node B (eNB) herein), to generate and transmit a number of OFDMA Channel State Information Reference Signals (CSI-RSs). The OFDMA CSI-RSs may be determined based on the principal (e.g., top eight) eigen beams associated with an average channel covariance matrix determined based on the received sounding reference signals. A UE, in response to receiving the OFDMA CSI-RSs, may determine a preferred eigen beam and transmit a quantized version of the preferred eigen beam back to the eNB. Subsequent communications with the UE may be made using beamforming techniques that are based on the quantized version of the preferred eigen beam. The techniques described herein may be particularly useful for LTE-Advanced systems, in which the number of supported antenna ports may be limited to eight.

Consistent with aspects described herein, an eNB may include processing circuitry to: receive a plurality of sounding reference signals from a corresponding plurality of UEs, the plurality of sounding reference signals each being received using a plurality of antenna elements; identify, based on the received sounding reference signals, a plurality of principal eigen beams; generate, based on the principal eigen beams, a plurality of OFDMA channel state information reference signals; transmit, to at least one of the UEs, the plurality of OFDMA channel state information reference signals; receive, from the at least one of the UEs, a recommended quantized eigen beam; and transmit, to the at least one of the UEs and based on the recommended quantized eigen beam, data for the at least one of the UEs.

In some implementations, the eNB may be further to measure, based on the received sounding reference signals, uplink channel state information for each of the UEs; and determine, based on the uplink channel state information, an average channel covariance matrix for the plurality of UEs, wherein the plurality of principal eigen beams are identified based on the average channel covariance matrix. Additionally, in some implementations, a first quantity of logical antenna ports are used, by the eNB, to control the plurality of antenna elements, wherein the plurality of antenna elements is a second quantity of antenna elements, the second quantity being greater than the first quantity.

Additionally, in some implementations, a quantity of the plurality of principal eigen beams is equal to the first quantity of logical antenna ports. In some implementations, the first quantity of logical antenna ports may be equal to eight.

In some implementations, the processing circuitry, when transmitting the data, is further to: transmit the data via beamforming that is performed based on the recommended quantized eigen beam and based on the plurality of principal eigen beams. In some implementations, the recommended quantized eigen beam may be received as a plurality of quantization parameters, wherein the quantization parameters quantify amplitude elements of the recommended quantized eigen beam using a first quantity of bits for each amplitude element and phase elements of the recommended quantized eigen beam are quantized using a second quantity of bits for each phase element.

In some implementations, the recommended quantized eigen beam is received as a plurality of quantization parameters, wherein the quantization parameters quantify amplitude elements of the recommended quantized eigen beam using a different quantity of bits for different amplitude elements and phase elements of the recommended quantized eigen beam are quantized using a different quantity of bits for different phase elements.

Consistent with other aspects described herein, a UE may comprising circuitry to: receive a plurality of OFDMA signals, wherein each received OFDMA signal is transmitted, from an eNB with an independent beamforming pattern and from an antenna array having a plurality of antenna elements; determine, based on the received OFDMA signals, a preferred eigen beam for the UE; quantize, using a predetermined quantization technique, a representation of the preferred eigen beam; transmit, to the eNB, the quantized representation of the preferred eigen beam; receive data, from the eNB, wherein the received data is decoded, by the UE, based on the data having been encoded, by the eNB, using the transmitted representation of the preferred eigen beam.

In some implementations, the quantized representation of the preferred eigen beam may include a quantization of an amplitude and phase of a plurality of elements of the preferred eigen beam. Additionally, in one implementation, an amount of the plurality of the elements of the preferred eigen beam is equal to an amount of antenna ports associated with the eNB.

In some implementations, an amount of the plurality of antenna elements is greater than the amount of antenna ports. Additionally, when transmitting the quantized representation of the preferred eigen beam, the processing circuitry may further transmit at least one of: a wideband Channel Quality Indication (CQI) conditioned on the preferred eigen beam; or a subband CQI conditioned on the preferred eigen beam.

In some implementations, the eNB is associated with eight antenna ports and the processing circuitry is to quantize the representation of the preferred eigen beam as:

$$\hat{v}_1 = \begin{bmatrix} \hat{\rho}_1 & \hat{\rho}_2 e^{j\hat{\varphi}_2} & \hat{\rho}_3 e^{j\hat{\varphi}_3} & \hat{\rho}_4 e^{j\hat{\varphi}_4} & \hat{\rho}_5 e^{j\hat{\varphi}_5} & \hat{\rho}_6 e^{j\hat{\varphi}_6} & \hat{\rho}_7 e^{j\hat{\varphi}_7} & \hat{\rho}_8 e^{j\hat{\varphi}_8} \end{bmatrix}^T \Big/ \sqrt{\left(\sum_{m=1}^{8} \hat{\rho}_m^2\right)}$$

wherein, $\hat{v}_1$ is the preferred eigen beam, and wherein $\hat{\rho}_m$ and $e^{j\hat{\varphi}_m}$ represent an amplitude and phase, respectively, of the $m^{th}$ element of the preferred eigen beam, and wherein $$\hat{\rho}_m = (a_m + 0.5) \times 0.25,$$
$$a_m \in \{0, 1, 2, 3\},$$
$$m = 1, 2, 3, 4, 5, 6, 7;$$
$$\hat{\rho}_8 = \sqrt{1 - \min\left(\sum_{m=1}^{7} \hat{\rho}_m^2, 1\right)};$$

and $$\hat{\varphi}_n = (b_n + 0.5)\frac{2\pi}{8},$$
$$b_n \in \{0, 1, 2, 3, 4, 5, 6, 7\},$$
$$n = 2, 3, 4, 5, 6, 7, 8.$$

In some implementations, the processing circuitry is further to: transmit sounding reference signals to the eNB.

Consistent with other aspects described herein, a non-transitory computer readable medium may contain program instructions for causing control circuitry, associated with an eNB, to: receive a plurality of sounding reference signals, wherein each received sounding reference signal is transmitted from UE being served by the eNB, the plurality of sounding reference signals each being received by greater than eight antenna elements of the eNB; measure, based on the received sounding reference signals, an uplink channel matrix for each of the UEs; determine an average channel covariance matrix from the uplink channel matrixes associated with the UEs; determine the largest principal eigen beams of the average channel covariance matrix; receive, from a particular UE of the plurality of UEs, a recommended quantized eigen beam; reconstruct beamforming weights for the antenna elements of the eNB, from the recommended quantized eigen beam and the determined principal eigen beam; and transmit data, to the particular UE, using the reconstructed beamforming weights.

In some implementations, the non-transitory computer readable medium may additionally include program instructions for causing the control circuitry to: create a plurality of OFDMA channel state information reference signals. In some implementations, a first quantity of logical antenna ports are used, by the eNB, to control the antenna elements of the eNB, wherein the quantity of logical antenna ports equals eight or fewer. In some implementations, an amount of the principal eigen beams is equal to the first quantity of logical antenna ports.

In some implementations, the recommended quantized eigen beam is received as a plurality of quantization parameters, wherein the quantization parameters quantify amplitude elements of the recommended quantized eigen beam using a first quantity of bits for each amplitude element and phase elements of the recommended quantized eigen beam are quantized using a second quantity of bits for each phase element. In some implementations, the recommended quantized eigen beam is received as a plurality of quantization parameters, wherein the quantization parameters quantify amplitude elements of the recommended quantized eigen beam using a different quantity of bits for different amplitude elements and phase elements of the recommended quantized eigen beam are quantized using a different quantity of bits for different phase elements.

Consistent with another embodiment described herein, an eNB may include means for receiving a plurality of sounding reference signals from a corresponding plurality of UEs, the plurality of sounding reference signals each being received using a plurality of antenna elements; means for identifying, based on the received sounding reference signals, a plurality of principal eigen beams; means for generating, based on the principal eigen beams, a plurality of OFDMA channel state information reference signals; means for transmitting, to at least one of the UEs, the plurality of OFDMA channel state information reference signals; means for receiving, from the at least one of the UEs, a recommended quantized eigen beam; and means for transmitting, to the at least one of the UEs and based on the recommended quantized eigen beam, data for the at least one of the UEs.

In some implementations, the eNB may further include means for measuring, based on the received sounding reference signals, uplink channel state information for each of the UEs; and means for determining, based on the uplink channel state information, an average channel covariance matrix for the plurality of UEs, wherein the plurality of principal eigen beams are identified based on the average channel covariance matrix.

Figure 1:
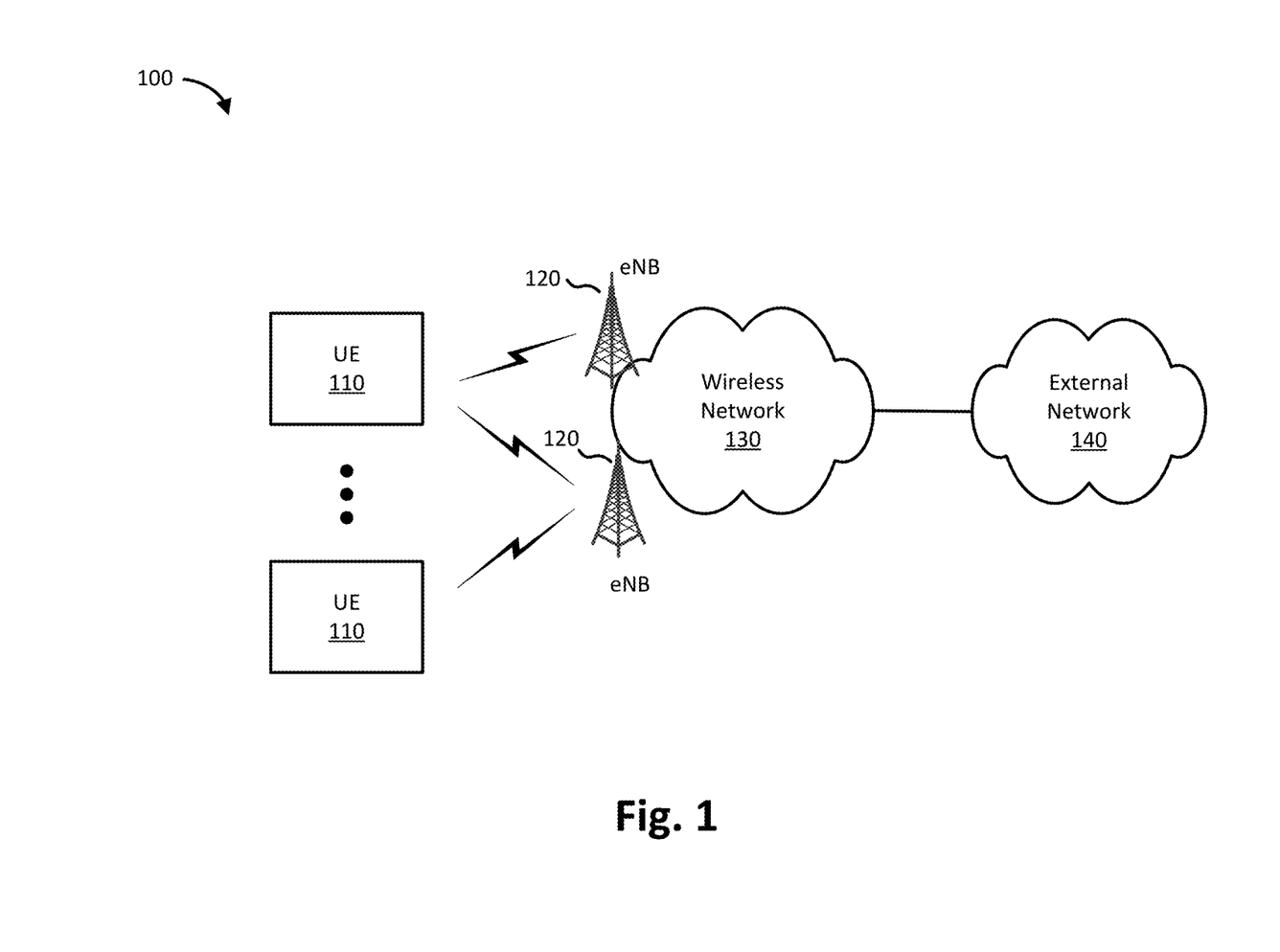
FIG. 1 is a diagram illustrating an example communication network in which concepts described herein may be implemented.

FIG. 1 is a diagram illustrating an example communication network 100 in which concepts described herein may be implemented. Communication network 100 may include UEs, wireless network 130, and external network 140. Wireless network 130 may include one or more eNBs 120.

UEs 110 may each include a portable computing and communication devices, such as a personal digital assistant (PDA), a smart phone, a cellular phone, a laptop computer with connectivity to a cellular wireless network, a tablet computer, etc. UEs 110 may also include non-portable computing devices, such as desktop computers, consumer or business appliances, or other devices that have the ability to connect to wireless network 130. UEs 110 may connect, through a radio link, to wireless network 130.

Wireless network 130, in one implementation, may be based on an LTE-Advanced architecture, and may include an Evolved Packet System (EPS) that includes and/or an evolved packet core (EPC) network that operates based on 3rd Generation Partnership Project (3GPP) wireless communication standards. In addition to eNBs 120, wireless network 130 may in include one or more network elements, such as Serving Gateways (SGWs), Mobility Management Entities (MMEs), and/or Packet Data Network Gateways (PGWs). The EPC network may enable UEs 110 to communicate with external network 140.

External network 140 may include one or more packet data networks (PDNs), such as the Internet, a metropolitan area network (MAN), a local area network (LAN), a wide area network (WAN), a private enterprise network, etc. External network 140 may be "external" to wireless network 130 in the sense that data transmission to and/or from UEs 110, via external network 140, may not be controlled by a carrier associated with wireless network 130 and/or may be via devices and/or networks not owned or operated by the carrier.

Although FIG. 1 illustrates example components of communication network 100, in other implementations, communication network 100 may contain fewer components, different components, differently arranged components, or additional components than those depicted. Alternatively, or additionally, one or more components of communication network 100 may perform one or more other tasks described as being performed by one or more other components of communication network 100.

Figure 2:
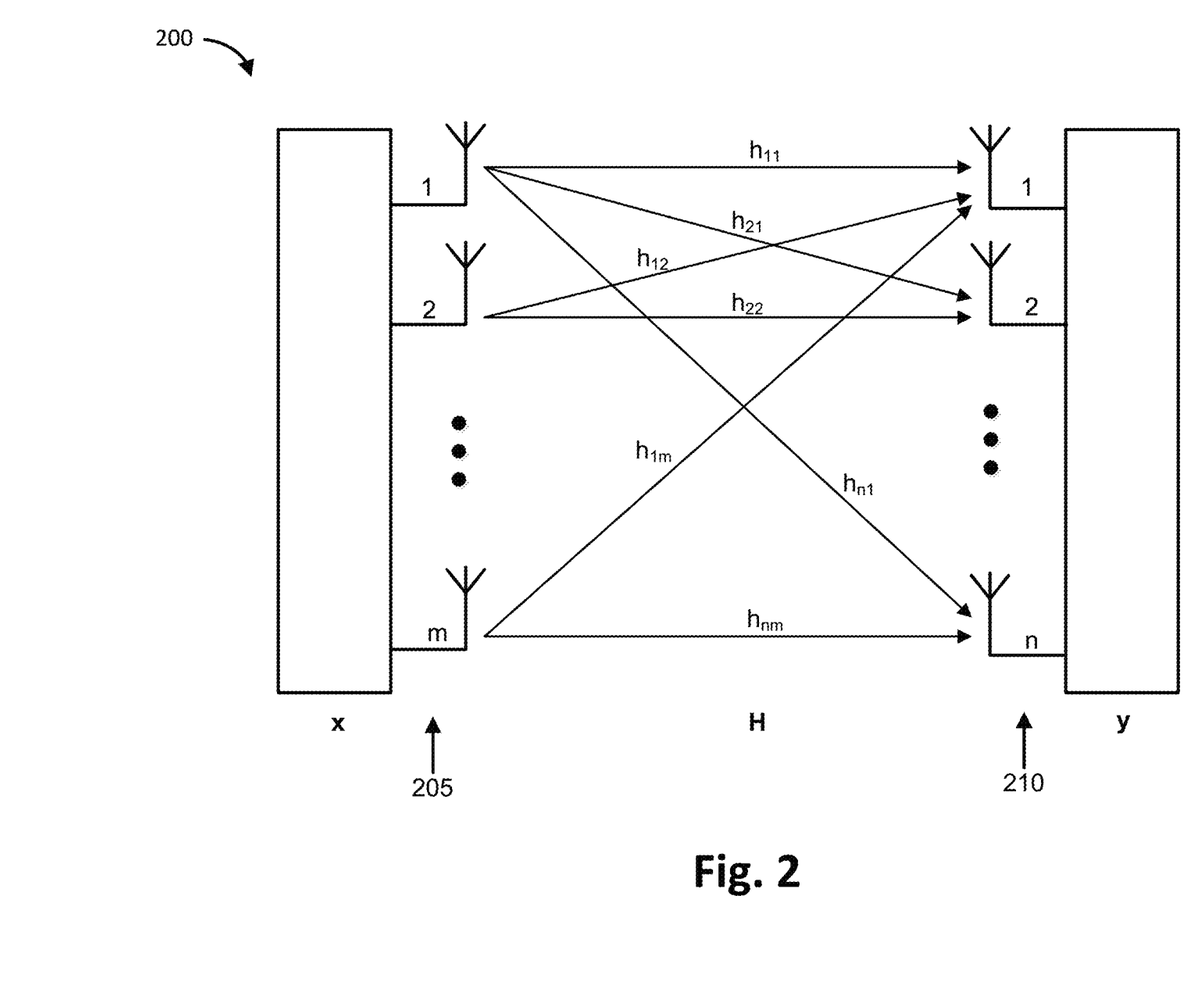
FIG. 2 is a diagram illustrating an example of a MIMO antenna system.

FIG. 2 is a diagram illustrating an example of a MIMO antenna system 200. As shown, MIMO system 200 may include m transmit antennas and n receive antennas 210. By using the same channel, every antenna may receive not only the direct components intended for it, but also the indirect components intended for the other antennas. The direct connection from antenna 1 to 1 is specified with $h_{11}$, etc., while the indirect connection from antenna 1 to 2 is identified as cross component $h_{21}$. A transmission matrix H may be defined as $$H = \begin{bmatrix} h_{11} & h_{12} & h_{..} & h_{1m} \\ h_{21} & h_{22} & h_{..} & h_{2m} \\ h_{..} & h_{..} & h_{..} & h_{..m} \\ h_{n1} & h_{n2} & h_{n\cdot} & h_{nm} \end{bmatrix}. \quad (1)$$

Transmission matrix H contains the channel impulse responses, $h_{nm}$, which reference the channel between the transmit antenna m and the receive antenna n. The rank of H defines the number of linearly independent rows or columns in H and indicates how many independent data streams (layers) can be transmitted simultaneously.

For an FD-MIMO system (Frequency Division-MIMO system), the transmission formula for determining receive signal vector y (i.e., the received information), from transmit signal vector x (i.e., the transmitted information), and noise η may be stated as:

$$y = Hx + \eta \quad (2).$$

Data to be transmitted may be divided into independent data streams, where the number of streams is less than or equal to the smaller number of antennas of the base station and terminal.

As mentioned, in some situations, the number of antenna ports that are used to control a MIMO antenna system may be less than the number of physical antenna elements in the MIMO system. In LTE-Advanced, for example, the number of available logical antenna ports may be limited to eight.

Figure 3:
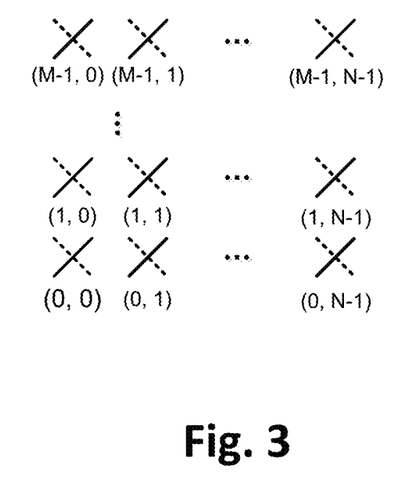
FIG. 3 is a diagram illustrating an example of a two-dimensional (2D) planar antenna array.

FIG. 3 is a diagram illustrating an example of a two-dimensional (2D) planar antenna array. In FIG. 3, the antenna elements may be arranged as pairs in which each antenna element of a pair is illustrated having a different slant angle, such as slant angles of +45 and −45 degrees. Antenna elements having a slant angle of +45 degrees are illustrated as solid line segments and antenna elements having a slant angle of −45 degrees are illustrated as dashed line segments. The 2D planar antenna array may be defined as having M columns of antenna element pairs and N rows. In a possible configuration in which M=10 and N=2, the 2D planar antenna array may include 40 antenna elements (20 antenna element pairs).

"Precoding" spatially-multiplexed MIMO systems refers to coding (e.g., mixing or combining data streams) prior to transmission by the antenna elements, based on knowledge of the current channel conditions, to combine the data streams with the goal of equalizing the signal reception across the receive antennas. Precoding may be based on transmit beamforming concepts with the provision of allowing multiple beams to be simultaneously transmitted in the MIMO system.

A precoding matrix, P, may be used to represent the precoding operation. With the addition of the precoding matrix, equation (1) may be rewritten as:

$$y = HPx + \eta \quad (3);$$

where y (the received information) is a $N_r \times 1$ vector, H (the transmission matrix) is a $N_r \times N_t$ matrix, P (the precoding matrix) is a $N_t \times N_p$ matrix, x (the transmitted information) is a $N_p \times 1$ vector, and η (noise) is a $N_r \times 1$ vector. Also, in equation (3), $N_r$ is the number of receiving antennas, $N_t$ is the number of transmitting antennas, $N_p$ is number of layers (also called data streams herein). If the antenna array is a 2D antenna array, such as that illustrated in FIG. 3, $N_t=2NM$ and $N_t$ may be much larger than eight (i.e., much larger than the maximum number of defined antenna ports). For example, when N=2 and M=10, $N_t=40$.

Consistent with aspects described herein, the total number of antenna elements, $N_t$, may be virtualized into $N_c$ antenna ports as $$y = H P_c P_d x + \eta = \hat{H} P_d x + \eta \quad (4),$$

where $P_c$ is a $N_t \times N_c$ matrix, $P_d$ is a $N_c \times N_p$ matrix, and $\hat{H} = H P_c$ is the effective channel matrix where $\hat{H}$ is a $N_r \times N_c$ matrix and $N_r = N_c K$ (where K represents the number of receiving UEs).

As can be seen from equation (4), the precoding design problem for P may be split into designing $P_c$ and $P_d$. $P_c$ may be calculated semi-statically (e.g., once every time a terminal enters or leaves the cell) by the eNB and $P_d$ may be represented as a codebook that is used to quantify the measured effective channel. The codebook used to quantize $P_d$ may be dependent on the design of $P_c$.

In one implementation, $P_c$ may be designed by subtracting the major channel directions of all the active UEs 110 (K UEs) in one cell into $N_c$ basic channel directions. Each individual UE's best channel direction may then become a combination of those $N_c$ basic channel directions of one cell. This design may be applicable for both Time Division Duplex (TDD) and Frequency Division Duplex (FDD) communications.

In one implementation, $P_c$ may be designed based on the principal that antenna port virtualization vectors are calculated from the composite channel covariance matrix. More particularly, through uplink (UL) sounding (e.g., via Sounding Reference Signals (SRS) transmitted by UEs 110, to eNB 120, and used by eNB 120 to estimate the uplink channel quality), eNB 120 may estimate UL channel $\widetilde{H_k}$ for each individual UE where $\widetilde{H_k}$ is the estimated UL channel matrix for user k. By single value decomposition, eNB 110 can calculate the principal eigen beams from the average channel covariance matrix of all UEs. The principal eigen beams may be calculated as $$\frac{1}{K} \sum \widetilde{H_k}^H \widetilde{H_k} = U S V^H, \quad (5)$$

where $V = [v_1 \ldots v_{N_c}]$, and $v_c$ is the $c^{th}$ the principal eigen beam. The eNB may construct matrix $P_c$ from the $N_c$ largest principal eigen beams from the average channel covariance matrix. That is, $P_c$ may be defined as $$P_c = [v_1 \ldots v_{N_c}] \quad (6)$$

Given the above definition of $P_c$, the design problem for $P_d$ can be described as designing a principal eigen beam quantization technique for the effective channel $\hat{H} = H P_c$.

One principal eigen beam quantization technique may be based on using single value decomposition to extract the eigen beams of the effective channel $\hat{H}$:

$$\hat{H} = \hat{U} \hat{S} \hat{V}^H \quad (7),$$

where $\hat{V} = [\hat{v}_1 \ldots ]$, and $\hat{v}_1$ is the principal eigen beam of the effective channel $\hat{H}$. For $N_c = 8$ (corresponding to the LTE-Advanced option of using 8 antenna ports), $\hat{v}_1$, after normalization, can be represented as:

$$\hat{v}_1 = [\rho_1 \rho_2 e^{j\phi_2} \rho_3 e^{j\phi_3} \rho_4 e^{j\phi_4} \rho_5 e^{j\phi_5} \rho_6 e^{j\phi_6} \rho_7 e^{j\phi_7} \rho_8 e^{j\phi_8}]^T \quad (8),$$

where $\Sigma_{m=1}^{8} \rho_m^2 = 1$, $\rho_m \in [0,1]$, m=1, ..., 8, $\phi_m \in [0, 2\pi)$, m=2, ... 8

The first element, $\rho_1$, may be represented by one amplitude and the remaining elements may be represented by one amplitude and one phase. The amplitude of each element represents how one particular channel realization is mapped to one cell specific eigen beam.

Figure 4:
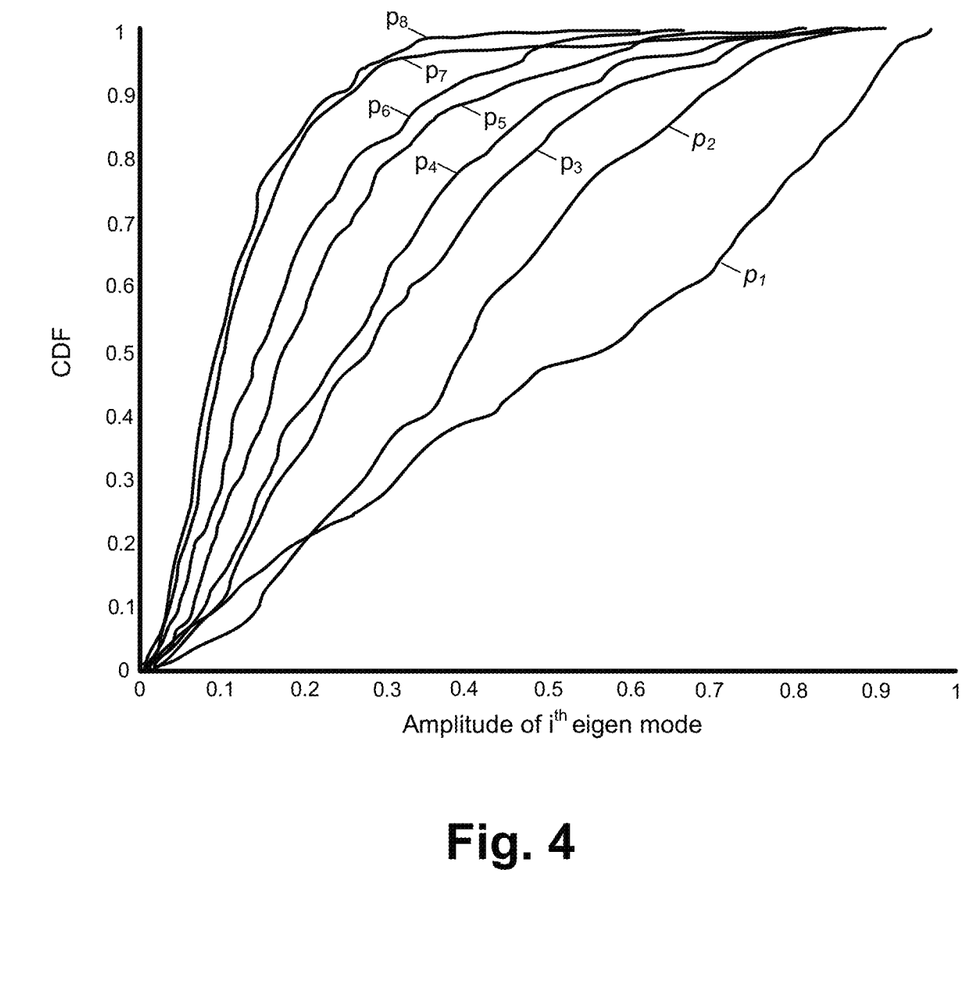
FIG. 4 is a diagram illustrating an example of measured cumulative distribution functions.

FIG. 4 is a diagram illustrating an example of measured cumulative distribution functions (CDFs) of amplitudes of $\rho_1$ to $\rho_8$. The CDFs shown in FIG. 4 may have been obtained by statistically analyzing measurements of the amplitudes of the first eight eigen beams. As can be seen in FIG. 4, the amplitude of the stronger cell specific eigen beams, e.g. the first element of the principal eigen beam (labeled as $p_1$) and the second element of the principal eigen beam (labeled as $p_2$), are relatively evenly distributed between zero and one. However, the amplitudes for the weaker elements of the principal eigen beam (e.g., $\rho_3$ to $\rho_8$) are more concentrated at values close to zero. However, there remains a small probability that the amplitude of the weaker elements of the principal eigen beam have a large weight close to one for some particular channel realization.

The principal eigen beam of the effective channel $\hat{v}_1$ can be quantized by quantizing the amplitude and phase of each element of the principal eigen beam.

One technique for quantizing the amplitude and phase of each element of the principal eigen beam may be based on a quantization technique in which even weighting (e.g., an equal number of bits) is assigned to each element of the principal eigen beam. For example, assume $N_A$ bits are used to quantize the amplitude of $\rho_1$ to $\rho_{N_c}$. The value range [0, 1] may be split into $2^{N_A}$ regions. This can be described as:

$$\hat{\rho}_m = \left( \lfloor \rho_m / \left( \frac{1}{2}^{N_A} \right) \rfloor + 0.5 \right) \frac{1}{2^{N_A}}. \quad (9)$$

Similarly, $N_p$ bits may be used to quantize the phase $\phi_2$ to $\phi_{N_c}$. The phase value range of $[0, 2\pi)$ may then be split into $2^{N_p}$ regions. This can be described as:

$$\hat{\varphi}_m = \lfloor \varphi_m / (2\pi / 2^{N_p}) \rfloor + 0.5) \frac{2\pi}{2^{N_p}}. \quad (10)$$

For example, for $N_A = 2$ and $N_p = 3$, and for $N_c = 8$ (i.e., eight antenna ports) 37 bits would be required to quantize the principal eigen beam $\hat{v}_1$.

Another possible technique for quantizing the amplitude and phase of each element of the principal eigen beam may be based on a quantization technique in which uneven weighting (e.g., a different number of bits) is assigned to each element of the principal eigen beam. In general, more bits may be assigned to the more dominant elements of the principal eigen beam. For the elements of the principal eigen beams shown in FIG. 4, the weaker cell specific elements of the principal eigen beam have a larger probability of having a smaller value. This observation can be leveraged to save overhead for quantizing the weaker cell specific elements of the principal eigen beam or to improve quantization performance with the same overhead.

For example, for the stronger cell specific eigen beams, e.g. $\rho_1$ to $\rho_4$, equation (9) can be used. But for the weaker cell specific elements of the principal eigen beam, e.g. $\rho_5$ to $\rho_8$, a different equation can be used. For example, the following equation may be used to quantize $\rho_5$ to $\rho_8$ by quantizing values in the range [0, 0.3] into $2^{N_A}-1$ ranges and quantizing the values [0.3, 1] to a fixed number, e.g. 0.9.

$$\hat{\rho}_m = \begin{cases} \left(\left\lfloor \rho_m / \left(\frac{0.3}{(2^{N_A}-1)}\right)\right\rfloor + 0.5\right)\frac{0.3}{(2^{N_A}-1)} & \text{if } \rho_m \in [0, 0.3) \\ 0.9 & \text{otherwise} \end{cases} \quad (11)$$

With the unit vector energy limitation $\Sigma_{m=1}^{8}\rho_m^2=1$, $\rho_m \in [0,1]$, $m=1, \ldots, 8$, quantization overhead can be further reduced. For example, equation (11) (below) can be used to save the amplitude overhead of the weakest element of the principal eigen beam. Thus, $\hat{\rho}_8$ (when eight antenna ports are used) does not require overhead.

$$\hat{\rho}_8 = \sqrt{1 - \min\left(\sum_{m=1}^{7} \hat{\rho}_m^2, 1\right)}. \quad (12)$$

In some implementations, wideband Channel Quality Indication (CQI)/wideband Pre-Coding Matrix (PMI) feedback mode over PUSCH may be used as an aperiodic channel state information feedback mode for reporting the eigen beam quantizations. Using CQI and/or PMI feedback may reduce the feedback overhead.

Figure 5:
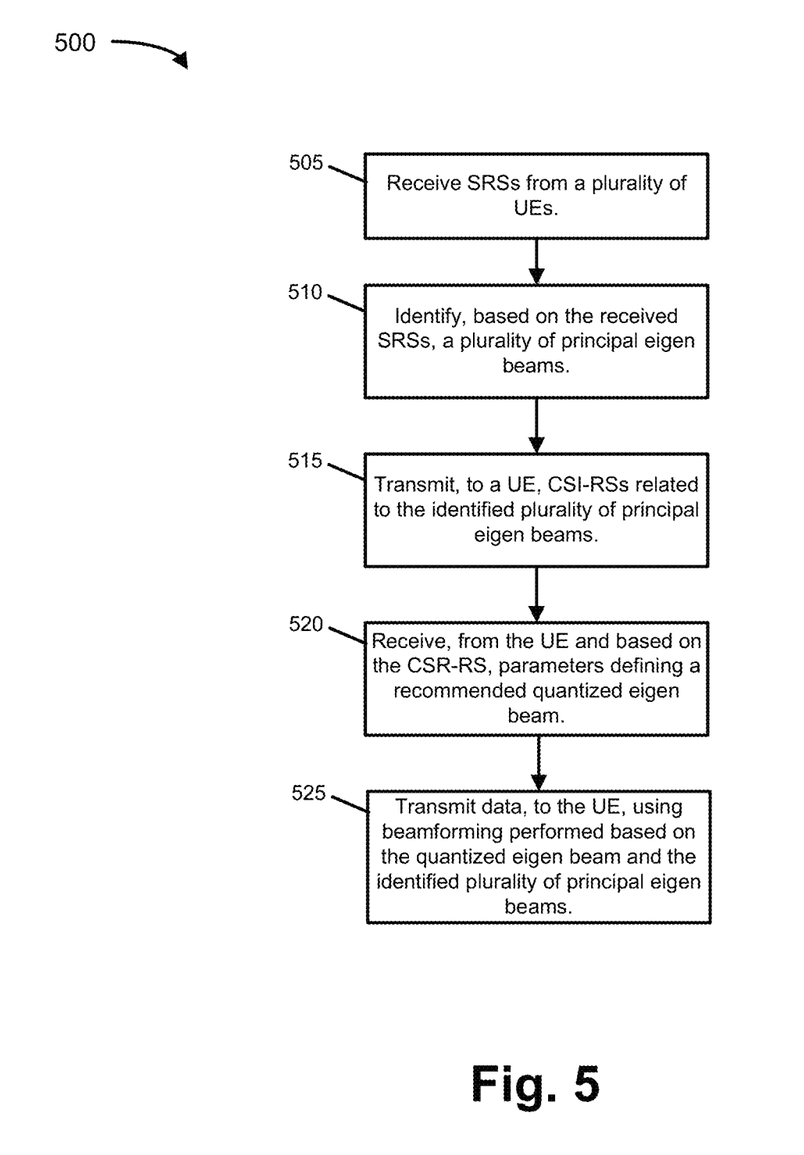
FIGS. 5 and 6 are flowcharts illustrating example processes for performing beamforming when the number of transmit antenna elements is larger than the number of available antenna ports.

FIG. 5 is a flowchart illustrating an example process 500 for performing beamforming when the number of transmit antenna elements is larger than the number of available antenna ports. Process 500 may be performed, for example, by eNB 120. Process 500 is based on the quantization techniques discussed above with reference to equations (4)-(12).

To begin, process 500 may include receiving SRSs from a number of UEs 110 (block 505). For example, UEs within a particular cell may transmit SRSs to the eNB 120 that is serving the UEs. The SRSs may allow eNB 120 to estimate the uplink channel quality, and in particular, to estimate the uplink channel matrix, $\widetilde{\mathbf{H}_k}$, for a particular UE k. The SRSs may be sent using the same or a different frequency as the downlink channel.

Process 500 may further include identifying, based on the received SRSs, a number of principal eigen beams (510). In one implementation, the particular number of principal eigen beams may be equal to the number of antenna ports. For instance, in LTE-Advanced, up to eight antenna ports may be used. In contrast, eNB 120 may use more, and potentially significantly more, antenna elements.

In one implementation, and as discussed previously, identifying the principal eigen beams may include determining, based on the SRSs, the uplink channel matrix, $\widetilde{\mathbf{H}_k}$, for each of the plurality of UEs 110. From this information, the average channel covariance matrix of all of the plurality of UEs may be determined. The plurality of principal eigen beams may be determined from the average channel covariance matrix (equation (5)).

Process 500 may further include transmitting, to a UE 110, CSI-RSs related to the identified plurality of principal eigen beams (block 515). The CSI-RSs may be generated, by eNB 120, as a number of OFDMA CSI-RSs, as determined from the principal eigen beams.

Process 500 may further include receiving, from the UE (i.e., the UE to which the CSI-RS was transmitted in block 515), parameters defining a recommended quantized eigen beam (520). The parameters defining the recommended quantized eigen beam may be quantized, for example, as discussed above with respect to formulas (9)-(12).

Process 500 may further include transmitting data, to the UE, using beamforming to control a number of antenna elements based on the quantized eigen beam (as received in block 520) and the identified plurality of principal eigen beams (block 525).

Figure 6:
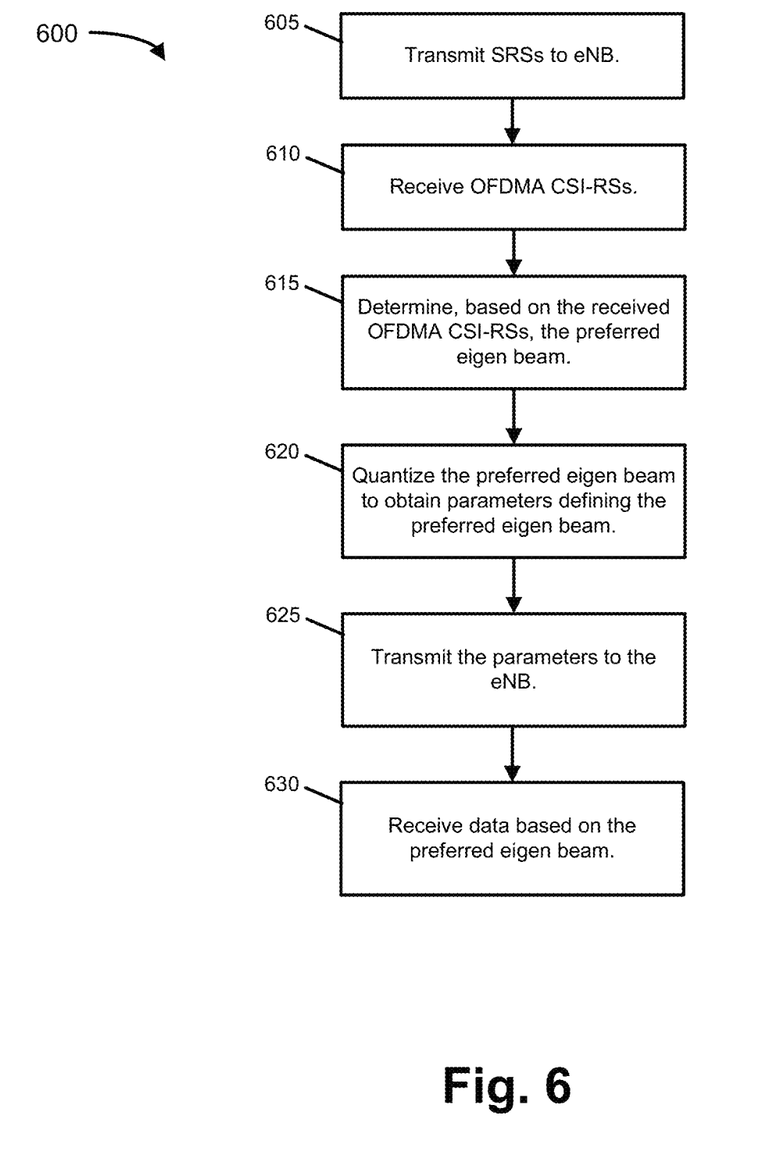

FIG. 6 is a flowchart illustrating an example process 600 for performing beamforming when the number of transmit antenna elements is larger than the number of available antenna ports. Process 600 may be performed, for example, by UE 110.

Process 600 may include transmitting SRSs to eNB 120 (block 605). As mentioned, the SRSs may be uplink SRSs that allow eNB 120 to estimate the uplink channel quality, and in particular, to estimate the uplink channel matrix, $\widetilde{\mathbf{H}_k}$, for the UE.

The eNB, based on the received SRSs, may generate and transmit CSI-RSs (see blocks 510 and 515, FIG. 5). Process 600 may include receiving the CSI-RSs from eNB 120 (block 610). As previously mentioned, the CSI-RSs may be OFDMA CSI-RSs. Each received OFDMA signal may be transmitted, by eNB 120, using an independent beamforming pattern from an antenna array with a relatively large number of antenna elements (e.g., greater than eight).

Process 600 may further include determining, based on the received OFDMA CSI-RSs, a preferred or "best" eigen beam (block 615). The determination of the preferred eigen beam may be based on measurements, by UE 110, of the received eigen beams associated with the CSI-RSs.

Process 600 may further include quantizing the preferred eigen beam (as determined in block 615), to obtain parameters defining the preferred eigen beam (block 620). The parameters defining the preferred quantized eigen beam may be quantized, for example, as discussed above with respect to formulas (9)-(12).

Process 600 may further include transmitting the parameters to the eNB (block 625). For example, UE 110 may transmit the bit pattern, of the preferred eigen beam, to eNB 120. Additionally, in some implementations, UE 110 may also transmit the wideband and/or subband CQI, conditioned based on the quantized eigen beam. The eNB may subsequently begin to transmit data, to UE 110, using beamforming (e.g., using all or a relatively large number of eNB antenna elements) that is performed based on the preferred eigen beam. Process 600 may further include correspondingly receiving data, from the eNB, based on the preferred eigen beam (block 630). For example, UE 110 may use a precoder calculated from the preferred eigen beam and may use the beamforming weight used to beamform the channel state information reference signal.

One possible implementation of the above-described techniques may be specified for 3GPP standards based on the modifications to the standards that are illustrated in Tables I and II, below. Table I includes possible additions to section 7.2.1 of the 3GPP standard TS 36.213 and Table II includes possible modifications to section 7.2.4 of the 3GPP standard TS 36.213.

TABLE I

Possible additions to section 7.2.1 of TS 36.213

Mode 1-1 description:
A single precoding matrix is selected assuming transmission on set S subbands
A UE shall report a wideband CQI value per codeword which is calculated
assuming the use of the single precoding matrix in all subbands and transmission
on set S subbands
The UE shall report the selected single precoding matrix indicator except with 8
CSI-RS ports and alternativeCodeBookEnabledFor8TX-r13 = FALSE configured
for transmission modes 9 and 10 or with alternativeCodeBookEnabledFor4TX-
r12 = TRUE configured for transmission modes 9 and 10, in which case a first and
second precoding matrix indicator are reported corresponding to the selected
single precoding matrix.
For transmission modes 9 and 10 with alternativeCodeBookEnabledFor8TX-
r12 = FALSE, the reported PMI and CQI values are calculated conditioned on the
reported RI. For other transmission modes or transmission mode 9 and 10 with
alternativeCodeBookEnabledFor8TX-r13 = TRUE they are reported conditioned
on rank 1.

TABLE II

Possible additions to section 7.2.4 of TS 36.213

If alternativeCodeBookEnabledFor8TX-r13 is configured, each rank one
codeword is represented as:

$$\hat{v}_1 = \left[\hat{p}_1 \ \hat{p}_2 e^{j\hat{\varphi}_2} \ \hat{p}_3 e^{j\hat{\varphi}_3} \ \hat{p}_4 e^{j\hat{\varphi}_4} \ \hat{p}_5 e^{j\hat{\varphi}_5} \ \hat{p}_6 e^{j\hat{\varphi}_6} \ \hat{p}_7 e^{j\hat{\varphi}_7} \ \hat{p}_8 e^{j\hat{\varphi}_8}\right]^T / \sqrt{\left(\sum_{m=1}^{8} \hat{p}_m^2\right)}$$

where $$\hat{p}_m = (a_m + 0.5) \times 0.25, a_m \in \{0, 1, 2, 3\}, m = 1, 2, 3, 4, 5, 6, 7$$

$$\hat{p}_8 = \sqrt{1 - \min\left(\sum_{m=1}^{7} \hat{p}_m^2, 1\right)}$$

$$\hat{\varphi}_n = (b_n + 0.5)\frac{2\pi}{8}, b_n \in \{0, 1, 2, 3, 4, 5, 6, 7\}, n = 2, 3, 4, 5, 6, 7, 8$$

The PMI for the corresponding rank one codeword is represented as
concatenating the binary version of $a_m$ and $b_n$ starting from lowest index
and each $a_m$ has two bits and each $b_n$ has three bits.

Figure 7:
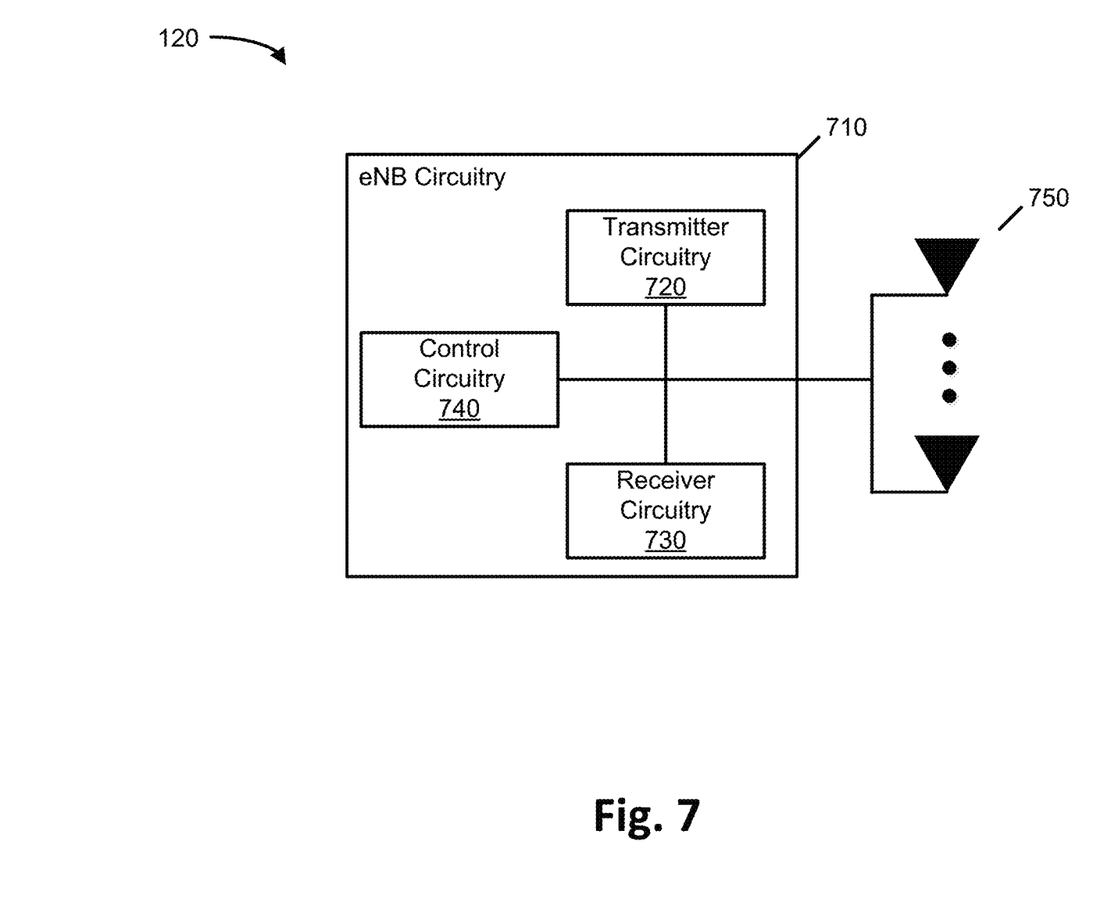
FIG. 7 is a diagram illustrating an example implementation of an eNB.

FIG. 7 is a diagram illustrating an example implementation of an eNB, such as one of eNBs 120. In various implementations, eNB 120 may include eNB circuitry 710, that may include transmitter circuitry 720, receiver circuitry 730, and control circuitry 740. Transmitter circuitry 720, receiver circuitry 730, and control circuitry 740 may be coupled to one another. In some implementations, the transmitter circuitry 720, receiver circuitry 730, and/or control circuitry 740 may be coupled to an antenna array 750 comprising a plurality of antenna elements. The components of eNB circuitry 710 may be configured to perform operations similar to those described elsewhere in this disclosure with respect to an eNB. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. The software or firmware programs may be stored in a memory, such as on non-transitory computer readable media, and may include programming instructions that are executable by one or more processors (e.g., a processor associated with control circuitry 740). In some embodiments, the electronic device circuitry may be implemented in, or functions associated with the circuitry may be implemented by, one or more software or firmware modules.

Figure 8:
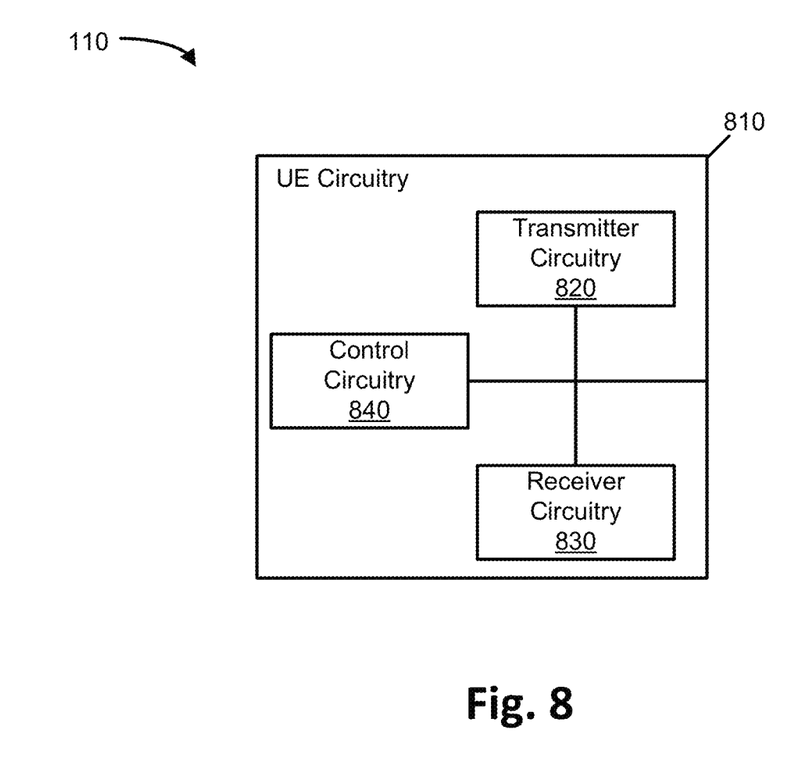
FIG. 8 is a diagram illustrating an example implementation of a UE.

FIG. 8 is a diagram illustrating an example implementation of a UE, such as one of UEs 110. In various implementations, UE 110 may include UE circuitry 810, that may include transmitter circuitry 820, receiver circuitry 830, and control circuitry 840. Transmitter circuitry 820, receiver circuitry 830, and control circuitry 840 may be coupled to one another. The components of UE circuitry 810 may be configured to perform operations similar to those described elsewhere in this disclosure with respect to UE 110. The software or firmware programs may be stored in a memory, such as on non-transitory computer readable media, and may include programming instructions that are executable by one or more processors (e.g., a processor associated with control circuitry 840). In some embodiments, the electronic device circuitry may be implemented in, or functions associated with the circuitry may be implemented by, one or more software or firmware modules.

Figure 9:
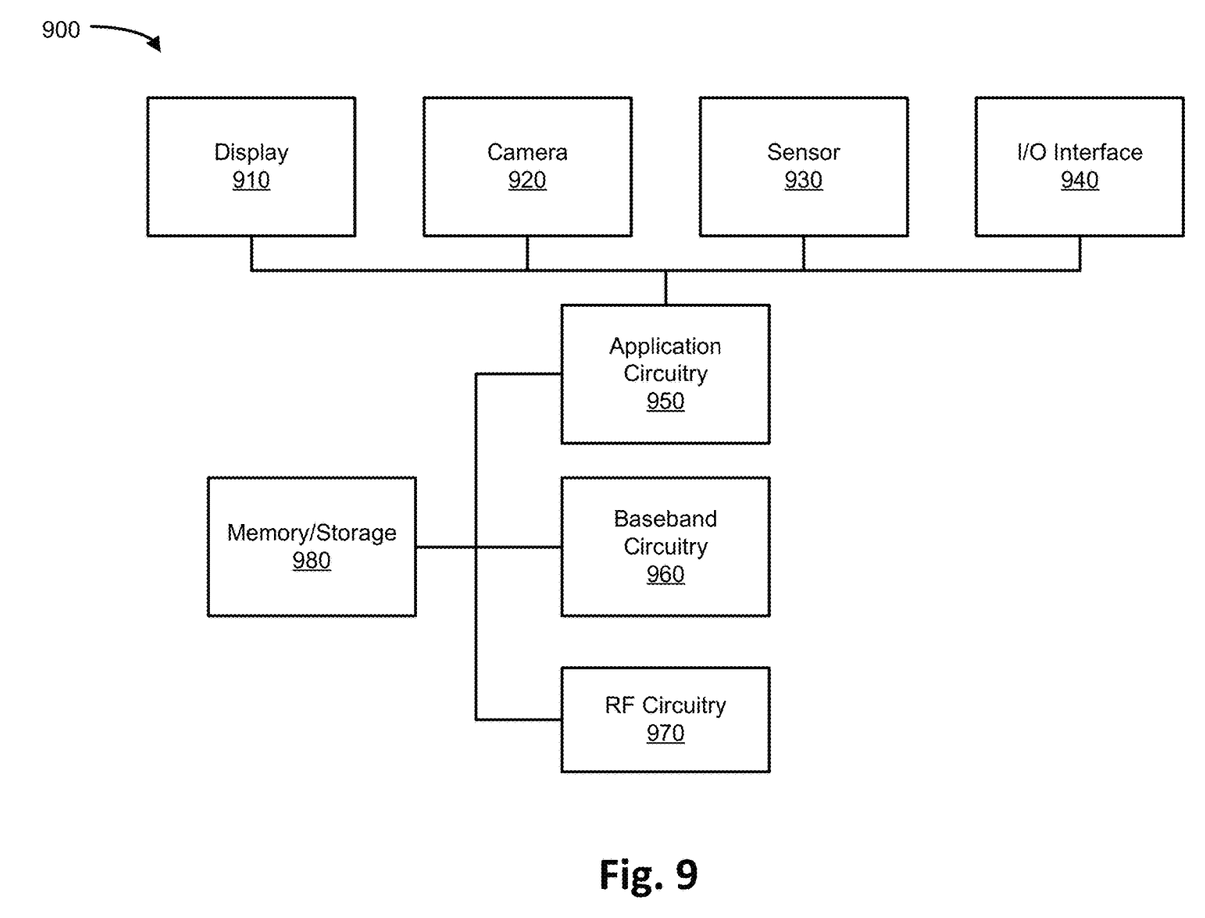
FIG. 9 illustrates an example computing device.

Embodiments described herein may be implemented into a system using any suitably configured hardware and/or software, in addition to or including that hardware/software that is shown in FIGS. 7 and 9. FIG. 9 illustrates another example system comprising display 910, camera 920, sensor 930, input/output (I/O) interface 940, application circuitry 950, baseband circuitry 960, radio frequency (RF) circuitry 970, and memory/storage 980, coupled with each other at least as shown.

Application circuitry 950 may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

Baseband circuitry 960 may include circuitry such as, but not limited to, one or more single-core or multi-core processors. The processor(s) may include a baseband processor. The baseband circuitry may handle various radio control functions that enables communication with one or more radio networks via RF circuitry 970. The radio control functions may include, but are not limited to, signal modulation, encoding, decoding, radio frequency shifting, etc. In some embodiments, baseband circuitry 960 may provide for communication compatible with one or more radio technologies. For example, in some embodiments, baseband circuitry 960 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 960 is configured to support radio communications of more than one wireless protocol may be referred to as multi-mode baseband circuitry.

In various embodiments, baseband circuitry 960 may include circuitry to operate with signals that are not strictly considered as being in a baseband frequency. For example, in some embodiments, baseband circuitry 960 may include circuitry to operate with signals having an intermediate frequency, which is between a baseband frequency and a radio frequency.

RF circuitry 970 may enable communication with wireless networks using modulated electromagnetic radiation through a non-solid medium. In various embodiments, RF circuitry 970 may include switches, filters, amplifiers, etc. to facilitate the communication with the wireless network.

In various embodiments, RF circuitry 970 may include circuitry to operate with signals that are not strictly considered as being in a radio frequency. For example, in some embodiments, RF circuitry 970 may include circuitry to operate with signals having an intermediate frequency, which is between a baseband frequency and a radio frequency.

In various embodiments, the transmitter circuitry, control circuitry, or receiver circuitry discussed above with respect to the UE or eNB may be embodied in whole or in part in one or more of the RF circuitry, the baseband circuitry, and/or the application circuitry.

In some embodiments, some or all of the constituent components of the baseband circuitry, the application circuitry, and/or the memory/storage may be implemented together on a system on a chip (SOC).

Memory/storage 980 may be used to load and store data and/or instructions. Memory/storage 980 may include any combination of suitable volatile memory (e.g., dynamic random access memory (DRAM)) and/or non-volatile memory (e.g., Flash memory).

In various embodiments, I/O interface 940 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 930 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry 960 and/or RF circuitry 970 to communicate with components of a positioning network, e.g., a global positioning system (GPS) satellite.

In various embodiments, display 910 may include a display (e.g., a liquid crystal display, a touch screen display, etc.).

In various embodiments, device 900 may be a mobile computing device such as, but not limited to, a laptop computing device, a tablet computing device, a netbook, an ultrabook, a wearable device, a smartphone, etc. In various embodiments, system may have more or less components, and/or different architectures.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. User Equipment (UE) comprising:
 a plurality of antenna elements; and
 processing circuitry to:
  receive, via the plurality of antenna elements, a plurality of orthogonal frequency division multiple access (OFDMA) signals, wherein each received OFDMA signal is transmitted, from an Evolved Node B (eNB) with an independent beamforming pattern and from an antenna array having a plurality of antenna elements;
  determine, based on the received OFDMA signals, a preferred eigen beam for the UE;
  quantize, using a predetermined quantization technique, a representation of the preferred eigen beam;
  transmit, to the eNB, the quantized representation of the preferred eigen beam; and receive data, from the eNB, wherein the received data is decoded, by the UE, based on the data having been encoded, by the eNB, using the transmitted representation of the preferred eigen beam, wherein the eNB is associated with eight antenna ports and the processing circuitry is to quantize the representation of the preferred eigen beam as:

$$\hat{v}_1 = [\hat{\rho}_1 \quad \hat{\rho}_2 e^{j\hat{\varphi}_2} \quad \hat{\rho}_3 e^{j\hat{\varphi}_3} \quad \hat{\rho}_4 e^{j\hat{\varphi}_4} \quad \hat{\rho}_5 e^{j\hat{\varphi}_5} \quad \hat{\rho}_6 e^{j\hat{\varphi}_6} \quad \hat{\rho}_7 e^{j\hat{\varphi}_7} \quad \hat{\rho}_8 e^{j\hat{\varphi}_8}]^T / \sqrt{\left(\sum_{m=1}^{8} \hat{\rho}_m^2\right)}$$

wherein, $\hat{v}_1$ is the preferred eigen beam, and wherein $\hat{\rho}_m$ and $e^{j\hat{\varphi}_m}$ represent an amplitude and phase, respectively, of the $m^{th}$ element of the preferred eigen beam, and wherein $$\hat{\rho}_m = (a_m + 0.5) \times 0.25,$$
$$a_m \in \{0, 1, 2, 3\},$$
$$m = 1, 2, 3, 4, 5, 6, 7;$$
$$\hat{\rho}_8 = \sqrt{1 - \min\left(\sum_{m=1}^{7} \hat{\rho}_m^2, 1\right)};$$

and $$\hat{\varphi}_n = (b_n + 0.5)\frac{2\pi}{8}, b_n \in \{0, 1, 2, 3, 4, 5, 6, 7\},$$
$$n = 2, 3, 4, 5, 6, 7, 8.$$

2. The UE of claim 1, wherein the quantized representation of the preferred eigen beam includes a quantization of an amplitude and phase of a plurality of elements of the preferred eigen beam.

3. The UE of claim 2, wherein an amount of the plurality of the elements of the preferred eigen beam is equal to an amount of antenna ports associated with the eNB.

4. The UE of claim 3, wherein an amount of the plurality of antenna elements, of the eNB, is greater than the amount of antenna ports.

5. The UE of claim 1, wherein, when transmitting the quantized representation of the preferred eigen beam, the processing circuitry is further to additionally transmit at least one of:
 a wideband Channel Quality Indication (CQI) conditioned on the preferred eigen beam; or
 a subband CQI conditioned on the preferred eigen beam.

6. The UE of claim 1, wherein the processing circuitry is further to:
 transmit sounding reference signals (SRSs) to the eNB.

7. A non-transitory computer readable medium containing program instructions for causing control circuitry, associated with User Equipment (UE), to:
 receive a plurality of orthogonal frequency division multiple access (OFDMA) signals, wherein each received OFDMA signal is transmitted, from an Evolved Node B (eNB) with an independent beamforming pattern and from an antenna array having a plurality of antenna elements;
 determine, based on the received OFDMA signals, a preferred eigen beam for the UE;
 quantize, using a predetermined quantization technique, a representation of the preferred eigen beam;
 transmit, to the eNB, the quantized representation of the preferred eigen beam;
 receive data, from the eNB, wherein the received data is decoded, by the UE, based on the data having been encoded, by the eNB, using the transmitted representation of the preferred eigen beam, wherein the eNB is associated with eight antenna ports and the non-transitory computer readable medium further includes program instructions for causing the control circuitry to quantize the representation of the preferred eigen beam as:

$$\hat{v}_1 = [\hat{\rho}_1 \quad \hat{\rho}_2 e^{j\hat{\varphi}_2} \quad \hat{\rho}_3 e^{j\hat{\varphi}_3} \quad \hat{\rho}_4 e^{j\hat{\varphi}_4} \quad \hat{\rho}_5 e^{j\hat{\varphi}_5} \quad \hat{\rho}_6 e^{j\hat{\varphi}_6} \quad \hat{\rho}_7 e^{j\hat{\varphi}_7} \quad \hat{\rho}_8 e^{j\hat{\varphi}_8}]^T / \sqrt{\left(\sum_{m=1}^{8} \hat{\rho}_m^2\right)}$$

wherein, $\hat{v}_1$ is the preferred eigen beam, and wherein $\hat{\rho}_m$ and $e^{j\hat{\varphi}_m}$ represent an amplitude and phase, respectively, of the $m^{th}$ element of the preferred eigen beam, and wherein $$\hat{\rho}_m = (a_m + 0.5) \times 0.25,$$
$$a_m \in \{0, 1, 2, 3\},$$
$$m = 1, 2, 3, 4, 5, 6, 7;$$
$$\hat{\rho}_8 = \sqrt{1 - \min\left(\sum_{m=1}^{7} \hat{\rho}_m^2, 1\right)};$$

and $$\hat{\varphi}_n = (b_n + 0.5)\frac{2\pi}{8}, b_n \in \{0, 1, 2, 3, 4, 5, 6, 7\},$$
$$n = 2, 3, 4, 5, 6, 7, 8.$$

8. The non-transitory computer readable medium of claim 7, wherein the quantized representation of the preferred eigen beam includes a quantization of an amplitude and phase of a plurality of elements of the preferred eigen beam.

9. The non-transitory computer readable medium of claim 8, wherein an amount of the plurality of the elements of the preferred eigen beam is equal to an amount of antenna ports associated with the eNB.

10. The non-transitory computer readable medium of claim 9, wherein an amount of the plurality of antenna elements is greater than the amount of antenna ports.

11. The non-transitory computer readable medium of claim 7 wherein, when transmitting the quantized representation of the preferred eigen beam, the non-transitory computer readable medium further includes program instructions for causing the control circuitry to transmit:
 a wideband Channel Quality Indication (CQI) conditioned on the preferred eigen beam; or
 a subband CQI conditioned on the preferred eigen beam.

12. The non-transitory computer readable medium of claim 7, wherein the non-transitory computer readable medium further includes program instructions for causing the control circuitry to:
 transmit sounding reference signals (SRSs) to the eNB.

13. A method, performed by User Equipment (UE), comprising:
 receiving a plurality of orthogonal frequency division multiple access (OFDMA) Channel State Information Reference Signals (CSI-RS) signals, wherein each received OFDMA CSI-RS signal is transmitted, from an Evolved Node B (eNB) with an independent beamforming pattern and from an antenna array having a plurality of antenna elements;

determining a plurality of eigen beams associated with the plurality of the received OFDMA CSI-RS signals;

determining, based on the determined plurality of eigen beams associated with the plurality of the received OFDMA CSI-RS signals, a preferred eigen beam for the UE;

quantizing, using a predetermined quantization technique, a representation of the preferred eigen beam;

transmitting, to the eNB, the quantized representation of the preferred eigen beam; and receiving data, from the eNB, wherein the received data is decoded, by the UE, based on the data having been encoded, by the eNB, using the transmitted representation of the preferred eigen beam, wherein the eNB is associated with eight antenna ports and the non-transitory computer readable medium further includes program instructions for causing the control circuitry to quantize the representation of the preferred eigen beam as:

$$\hat{v}_1 = \begin{bmatrix} \hat{\rho}_1 & \hat{\rho}_2 e^{j\hat{\varphi}_2} & \hat{\rho}_3 e^{j\hat{\varphi}_3} & \hat{\rho}_4 e^{j\hat{\varphi}_4} & \hat{\rho}_5 e^{j\hat{\varphi}_5} & \hat{\rho}_6 e^{j\hat{\varphi}_6} & \hat{\rho}_7 e^{j\hat{\varphi}_7} & \hat{\rho}_8 e^{j\hat{\varphi}_8} \end{bmatrix}^T \Big/ \sqrt{\left(\sum_{m=1}^{8} \hat{\rho}_m^2\right)}$$

wherein, $\hat{v}_1$ is the preferred eigen beam, and wherein $\hat{\rho}_m$ and $e^{j\hat{\varphi}_m}$ represent an amplitude and phase, respectively, of the $m^{th}$ element of the preferred eigen beam, and wherein $$\hat{\rho}_m = (a_m + 0.5) \times 0.25,$$

$$a_m \in \{0, 1, 2, 3\},$$

$$m = 1, 2, 3, 4, 5, 6, 7;$$

$$\hat{\rho}_8 = \sqrt{1 - \min\left(\sum_{m=1}^{7} \hat{\rho}_m^2, 1\right)};$$

and $$\hat{\varphi}_n = (b_n + 0.5)\frac{2\pi}{8}, b_n \in \{0, 1, 2, 3, 4, 5, 6, 7\},$$

$$n = 2, 3, 4, 5, 6, 7, 8.$$

14. The method of claim 13, wherein the quantized representation of the preferred eigen beam includes a quantization of an amplitude and phase of a plurality of elements of the preferred eigen beam.

15. The method of claim 14, wherein an amount of the plurality of the elements of the preferred eigen beam is equal to an amount of antenna ports associated with the eNB.

16. The method of claim 15, wherein an amount of the plurality of antenna elements is greater than the amount of antenna ports.

17. The method of claim 13, wherein transmitting the quantized representation of the preferred eigen beam further includes:
    transmitting a wideband Channel Quality Indication (CQI) conditioned on the preferred eigen beam; or
    transmitting a subband CQI conditioned on the preferred eigen beam.

18. The method of claim 13, further comprising:
    transmitting sounding reference signals (SRSs) to the eNB.

* * * * *